Aug. 5, 1969  R. C. DAVIS  3,459,031
FLIGHT RECORDER CALIBRATOR
Filed Jan. 11, 1968  3 Sheets-Sheet 3

INVENTOR.
RONALD C. DAVIS
BY
Williamson, Palmatier
& Bains
ATTORNEYS 3,459,031
FLIGHT RECORDER CALIBRATOR
Ronald C. Davis, 3909 E. 78th St.,
Minneapolis, Minn. 55420
Filed Jan. 11, 1968, Ser. No. 697,156
Int. Cl. G01c 25/00
U.S. Cl. 73—1                                    8 Claims

ABSTRACT OF THE DISCLOSURE

A device for calibrating a flight data recorder comprising a housing adapted to be positioned within the flight data recorder and replacing the magazine for the recorder tape storage casette of the flight recorder. A commutator mounted for floating movement on the housing and having a plurality of surface portions, each portion being formed of one of two different materials which have an ultrasonic transmission differential of approximately two to one. A transducer engaging the commutator and being connected to a source of high frequency electrical current to be energized thereby and to produce an ultrasonic impulse which is conveyed to the commutator and to the stylus arm of the flight recorder. A receiver connected with the flight recorder stylus arm for receiving ultrasonic impulses therefrom and converting the ultrasonic impulses into electrical impulses. Circuit means connected to the receiver and receiving electrical impulses therefrom, and including indicator means converting the electrical impulses into an audible and/or visual signal.

---

A general object of this invention is to provide a one step direct contact calibrating device for calibrating flight data recorders more accurately, in less time and with less skilled operators than was heretofore possible with known calibrating systems and techniques.

A more specific object of this invention is to provide a calibrating device, for calibrating accurately the proper position of the diamond stylus of flight data recorders, after servicing of the latter, and which includes means for energizing the flight recorder diamond stylus with ultrasonic impulses and then converting the ultrasonic impulses into electrical impulses for ultimate conversion into perceptible signals so that an operator may readily and accurately adjust the flight recorder stylus to the proper setting in a one step operation.

These and other objects and advantages of this invention will more fully appear from the following description made in connection with the accompanying drawings wherein like reference characters refer to the same or similar parts throughout the several views, and in which.

Figure 1:
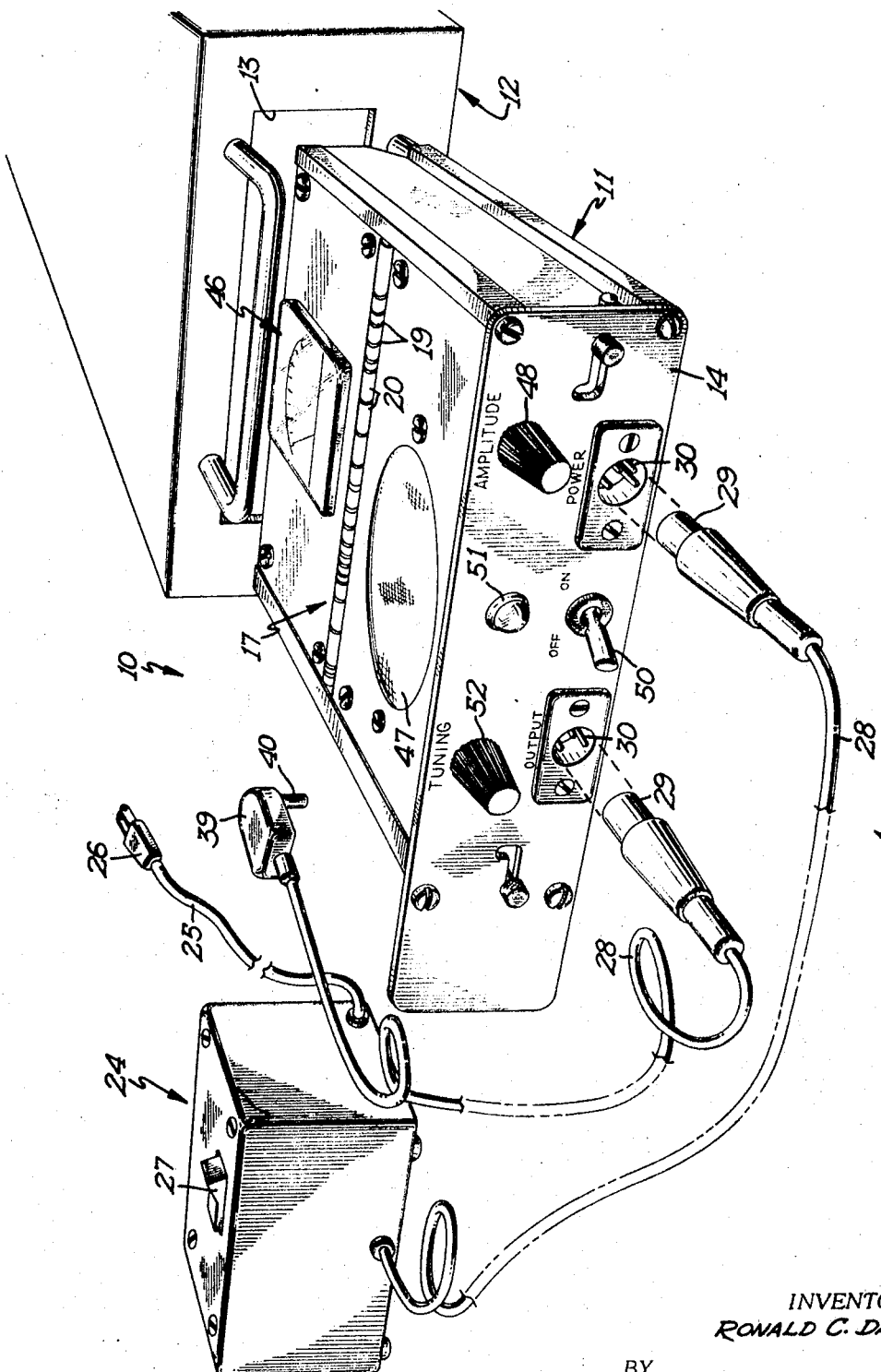
FIG. 1 is a perspective view of a flight data recorder and the novel calibrating device just prior to insertion of the calibrating device into the flight data recorder.

Referring now to the drawings and more specifically to FIG. 1, it will be seen that one embodiment of the novel calibrating device designated by the reference numeral 10 is there shown. The present calibrating device is contemplated for use in calibrating a flight data recorder of the type which is used in commercial airlines for recording flight data. The particular flight data recorder illustrated is of the type manufactured by Fairchild and this recorder records data on a stainless steel tape by means of a plurality of stylus arms each having a diamond cutting stylus at one end thereof. The data which is transcribed relates to the aircraft's altitude, air speed, heading and vertical acceleration. The use of stainless steel tape is for the purpose of minimizing destruction to the tape in the event that the airplane collides or crashes.

Since the flight data recorders are used extensively, it is necessary from time to time to overhaul or service the recorders. It should be pointed out that the use of flight data recorders is mandatory with respect to certain types of aircraft. In some instances, it is necessary to adjust, repair or replace the bearings or bushings of the stylus arms and this kind of maintenance requires that the stylus arm be carefully calibrated after servicing since it is essential that the recorder transcribe accurate information. Heretofore, calibration of the flight recorder and especially the proper positioning of the styluses after service and overhaul, involved a time consuming and, therefore, expensive operation.

In this regard, the technique currently used to calibrate after overhaul or servicing involves the steps of first operating the recorder to permit each diamond stylus to transcribe at a perselected setting on the stainless steel tape. The scribed line on the tape is then measured from a known reference point to determine if the stylus is accurately scribing. The operator in determining if the fine scribed line on the tape is accurate, must make an observation through a microscope. In the event that the scribed line indicates that the stylus is improperly set, then the stylus arm must be adjusted, and the flight data recorder operated to obtain another scribed line to check against the reference point. Ordinarily, this two-step trial and error calibrating operation involves a period of several hours and is difficult at best.

The present calibrating device 10 comprises an electro-mechanical module or housing which may be inserted into the cavity 13 of the flight data recorder normally occupied by the stainless steel tape storage casette. The device provides aural and visual indication when precise points of displacement from a reference point coincides with a positioning of the cutting edge of the diamond stylus. The cavity 13 normally accommodates the tape's storage casette so that the stainless steel tape is in a position to be engaged by the cutting edge of the diamond stylus. The module or housing 11 has one wall hereof which is exposed to the exterior when the module is positioned within the cavity and this exteriorly exposed wall actually defines a control panel 14.

Figure 2:
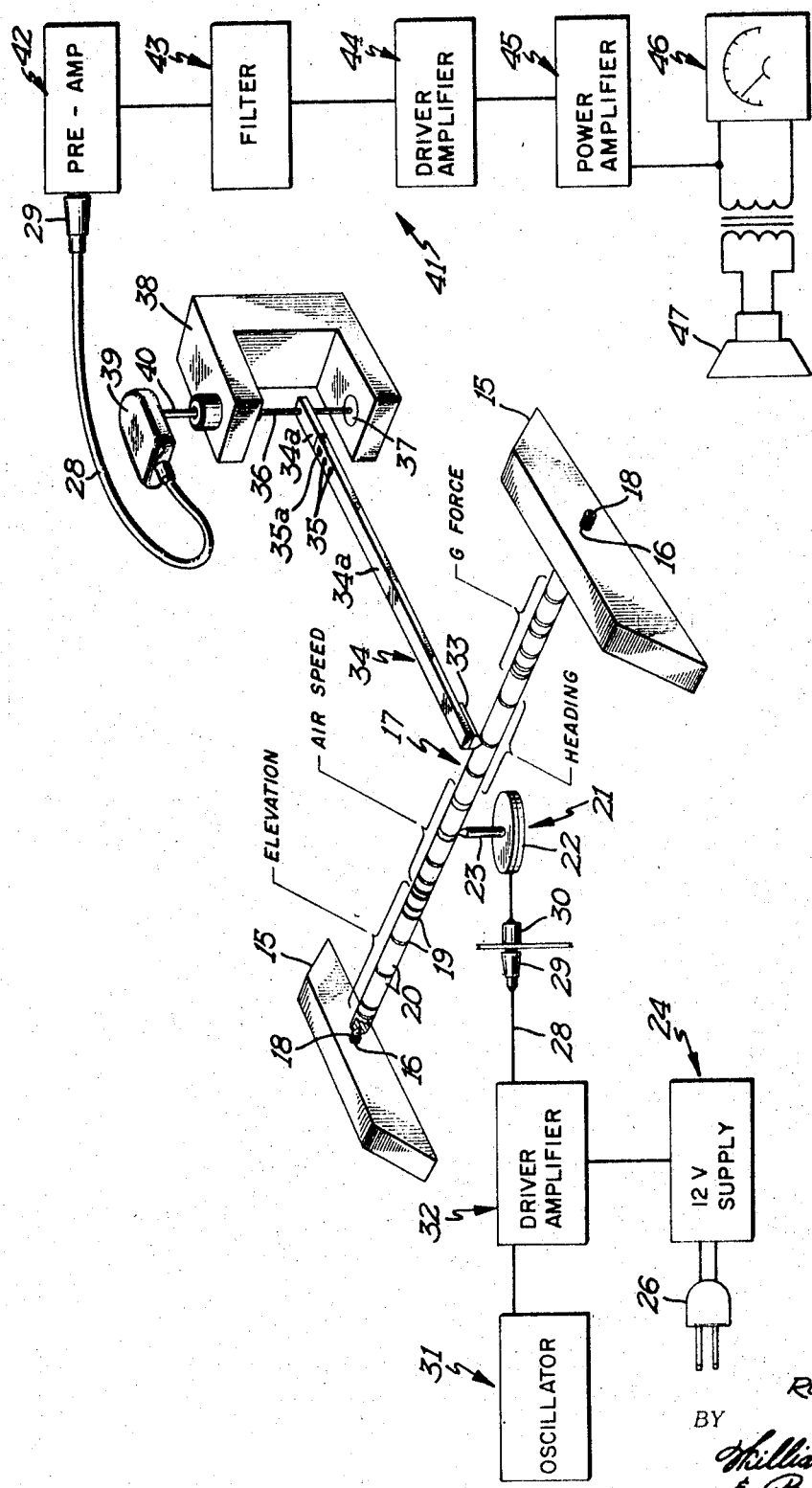
FIG. 2 is a diagrammatic perspective view of the calibrating device.

Referring now to FIG. 2, it will be seen that a pair of rigid support members 15 are rigidly affxed to the opposed side walls of the module adjacent the respective upper marginal portions of the side walls. These support members 15, each has a threaded bore 16 therethrough, these bores being disposed in axial alignment with respect to each other. The threaded bores 16 accommodate threaded screws 18 therein. The inner ends of these screws 18 engage opposite ends of an elongate cylindrical commutator 17. With this arrangement, the commutator 17 is mounted for limited longitudinal or axial movement relative to the supports 15.

Although the commutator is of cylindrical configuration, it is pointed out that the surface portions of the commutator include alternate portions of brass and plastic. In this regard, the commutator is turned from brass stock so that a plurality of collars or bands 18 are formed thereon. The reduced spaces between the collars are thereafter filled with a non-metallic substance, preferably epoxy cement, better known in the trade as Delrin; and the commutator is then ground to a common diameter. Thus, the commutator includes exposed surface bands 18 of brass or other suitable metal and are separated by wider bands 19 of non-metallic material.

Means are provided for energizing the commutator with an ultrasonic impulse and this means includes a transducer comprised of lead zirconite crystal having an enlarged generally lower portion 22 and an upper portion 23 projecting upwardly therefrom and being of a reduced size and terminating in a point which engages a brass band of the commutator at the mid-portion thereof. It is pointed out that there are transducers available other than lead zirconite crystals, and any suitable transducer may be used. When the transducer 21 vibrates at an ultrasonic frequency, these vibrations are transmitted to the commutator which will also vibrate at the ultrasonic frequency.

Means are provided for energizing the transducer with an ultrasonic impulse and this means comprises a source of high frequency electrical current. To this end, a power unit 24 is provided having suitable electrical conductors 25 connected thereto which in turn are provided with a conventional male or bayonet socket member which may be readily connected to a conventional 110 volt outlet. The power unit 24 comprises a conventional converter which converts the 110 AC current to a 12 volt DC current. The power unit is provided with a switch 27 to permit selective opening and closing of the power circuit, which is generally referred to as 24a.

Figure 3:
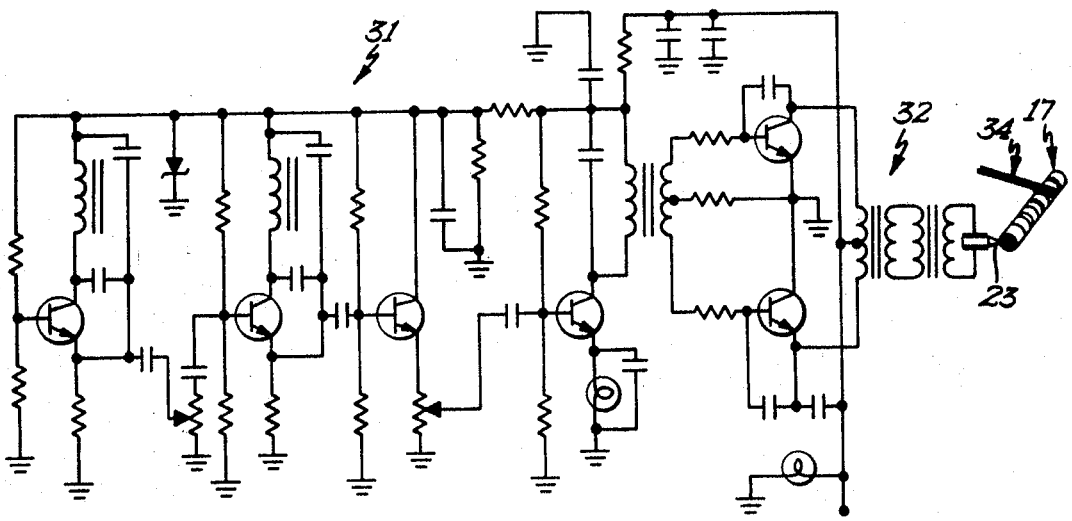
FIG. 3 is a schematic diagram of the transmitter circuit of the calibrating device.

The power circuit 24a is connected by suitable electrical conductors 28 to a female jack or plug 29. The female plug 29 is connected to the male plug or jack 30 of the oscillator and the receiver circuits. Referring now to FIGS. 2 and 3, it will be seen that the oscillator circuit is designated generally by the reference numeral 31 and converts the 12 volt direct current electrical impulse to an ultrahigh frequency electrical impulse preferably within the range of 25 to 50 kHz. This oscillator circuit is well known in the art and is available commercially as a unit.

The high frequency electrical signals or impulses, produced by the oscillator circuit are suitably amplified by an amplifier circuit designated generally by the reference numeral 32 which includes the transducer 21. In this regard, the enlarged lower portion 22 of the transducer has opposite surfaces thereof provided with a metallic coating, such as a silver coating to which are connected the electrical conductors of the amplifier circuit. With this arrangement, when the lead zirconite crystal transducer is energized by the ultrahigh frequency electrical impulses, ultrasonic impulses are generated in the transducer which ultrasonic impulses are within the range of 25 to 35 kHz., and preferably 28 kc. This ultrasonic signal is transmitted to the commutator 17 and then to the diamond stylus 33 which is in contact with the commutator 17.

It is pointed out that the flight recorder 12 is provided with a plurality of similar diamond styluses 33 each being secured to the free end of an elongate stylus arm 34. The stylus arm is comprised of a pair of channnel shaped telescoping arm sections 34a which are secured together by pairs of small screws 35. A small opening 35a is formed in one of the arm sections 34a to permit the insertion of a small tool therein. Again referring to FIG. 2 it will be seen that one end of each stylus arm 34 is gripped between a pair of axially aligned posts 36 each provided with a pair of bushings or bearings 37, which are positioned within axially aligned bores in a generally U-shaped mounting block 38. The posts 36 may be revolved about their longitudinal axis to cause swinging movement of the arm in response to a performance characteristic of the airplane in which the flight recorded is positioned. As pointed out above, a flight data recorder records data relating to altitude, air speed, heading, vertical acceleration and the like. Thus, the various stylus arms will have their associated posts 36 connected to the various devices which respond to the aforementioned flight parameters. The ultrasonic impulses are, therefore, received from the commutator 17 and transmitted through the diamond stylus 33 to the stylus arm 34, and to the posts 36.

Figure 4:
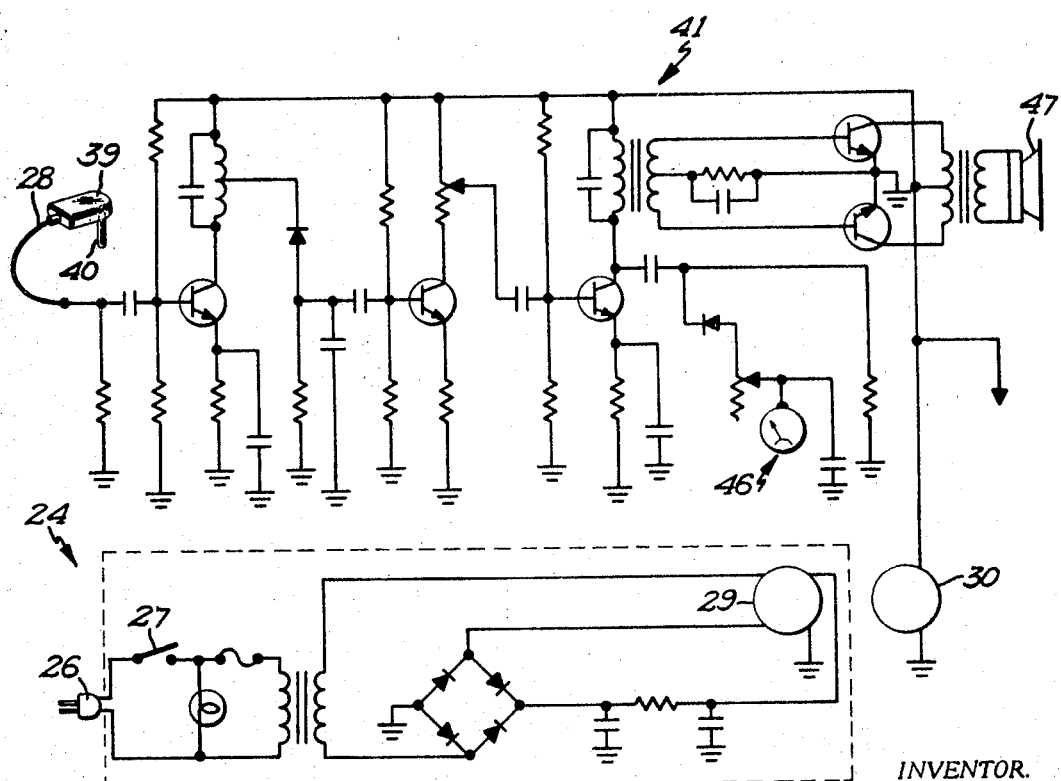
FIG. 4 is a schematic diagram of the receiver circuit thereof.

Means are provided for receiving the ultrasonic impulses and for converting the same into electrical impulses. This means includes a pickup head or sensor 39 which is formed of barium titanate crystal which includes a reduced portion 40 that is insertable into one of the bearings 37 for engagement with the post 36 associated therewith. It is also pointed out that there are many types of sensors or pickup heads available, and any suitable sensor may be used in lieu of one formed of barium titanate crystal. Thus the ultrasonic vibration sensed at this bearing post or pin 36 will be picked up by the pickup head 39. The ultrasonic vibration or impulses are converted to electrical impulses by the pickup sensor which is included in a receiver circuit designated generally by the reference numeral 41. This receiver circuit 41 actually constitutes a plurality of transistorized amplifying circuits as best seen in FIG. 4 so that the electrical impulses generated by the pickup head are progressively amplified, filtered and converted into a perceptible visual or audible signal.

In this regard, the receiver circuit 41 may include a preamplification circuit 42, a filter circuit 43, a driver amplification circuit 44, and a power amplification circuit 45. A detailed description of the components of the receiver circuit is felt unnecessary since the receiver circuit, per se, is not novel and the various components thereof, preferably transistorized components, are commercially available.

The ultrasonic vibrations or impulses which have been detected by the pickup sensor will be amplified by the receiver circuit and then the electrical impulses may be read out on a visually perceptible meter or as an audible tone. A speaker device 47 may also be provided so that an audio tone may be monitored by the speaker to assist an operator during the calibrating operations. A conventional meter 46 is provided and may be of conventional construction such as an ammeter or the like. The meter 46 is used to indicate contact between the stylus arm and commutator bands 18. The audio tone will also readily be perceptible to an operator. It will be noted that both the receiver and the oscillator circuits are positioned within the modular housing and only the power circuit is not encompassed within the module.

When the operator desires to calibrate a flight data recorder with the novel calibrating device, the tape storage casette will be removed from the cavity 13 and the housing or module 11 will be inserted into the cavity. Each diamond stylus 33 will engage the commutator 17 and will be positioned to engage one of the exposed brass bands of the commutator. It is pointed out that each group of brass bands relates to each flight parameter to be measured. In this regard, the group of brass bands located at the right as viewed in FIG. 2 are directed to vertical acceleration or G force settings, the next adjacent group to heading settings, then air speed settings, and, thereafter, the last group is directed to elevation settings.

In FIG. 2, the diamond cutting stylus 33 for recording the aircraft heading is illustrated in engaging relation with the central brass band 19 associated with the heading parameter. It will be noted that the transducer engages the commutator at the widest brass band thereof which, is associated with the aircraft air speed, and which is located substantially at the mid-point of the commutator.

Since the brass bands of the commutator correspond to positions or settings that are to be calibrated, the read out on the dial indicator meter may be in terms of inches from the known reference point which in the embodiment shown corresponds to a machined surface located interiorly of the flight data recorder housing. The commutator has a length corresponding to the width of the stainless tape upon which the data for the flight data recorder is scribed. The width of the brass bands of the commutator permits adjustments of each stylus within predetermined acceptable tolerance. If the heading parameter is to be calibrated, the diamond stylus 33 will be positioned into engaging relation progressively with the bands constituting this particular group.

In FIG. 2, the stylus 33 is illustrated engaging the central band of the heading group and this corresponds to a zero or due North setting and a 180° or due South setting. These particular settings are located 3.22 inches from the reference point and this value can be read directly from the meter. In the event that the setting of stylus is inaccurate, this can be readily determined by the operator from the meter and from the preceptible tone signal. Adjustment may be readily accomplished by loosening one of the screws 35 which interconnects the stylus arms sections 34a. Thereafter the operator may insert a small tool into the opening 35a and exert a prying action to cause relative shifting movement between the arm sections. The number of screws to be loosened depends upon the amount of adjustment required.

If the operator overcorrects or adjusts, and moves the stylus out of engaging relation with the brass surface or band, so that the stylus engages a plastic surface, this can be readily determined by both the meter and tone signal. In this regard, it is pointed out that the ultrasonic transmission differential between brass and the particular epoxy plastic used is approximately two to one. Thus, an operator may readily determine if the stylus is in engaging relation with the particular brass band associated with the predetermined setting to be calibrated. In the embodiment shown, the brass band which is engaged by the stylus in FIG. 2 is approximately 0.019 inch in width and the amount of tolerance which is permitted is ±0.0097 inch for this particular setting or positon. Thus a substantial degree of adjustment along the centermost band for the heading parameter may be obtained.

It will be appreciated that the strongest ultrasonic impulses or vibrations will be transmitted from adjacent the center of the commutator since this is the zone or point of transmission from the transducer. However, since the ultrasonic vibrations which are detected by the scribing styluses towards the ends of the commutator are relatively weak, the operator may readily compensate for this by adjusting the amplitude control located at the control panel of the module. This control knob is designated 48 and is within ready access to an operator. It is also pointed out that the control panel 14 is also provided with a master switch 50 for controlling power to the oscillator and receiver circuits and an indicator light 51. An adjustable knob 52 is provided to permit ultrasonic tuning to allow adjustment of the position of the null point of a standing wave.

From the foregoing it will be seen that the present calibrating device permits very accurate calibration of the scribing stylus arm assemblies for the flight data recorder in a single step operation which permits a substantial saving of time, as compared to the system now employed to calibrate flight data recorders.

The present calibrating device permits an operator to very accurately calibrate the flight data recorder after overhaul servicing, and maintenance in a matter of several minutes, whereas the technique employed heretofore involved several hours work by a highly skilled operator. The present device also permits calibration of flight data recorders by operators who are not required to be extensively trained for performing the calibrating operation. It is pointed out that while a commutator formed of brass and plastic has been used in the instant embodiment, commutators formed of other materials are also possible.

Thus, it will be seen that I have provided a novel calibrating device for calibrating flight data recorders after servicing and maintenance which functions in a more efficient manner than any heretofore known comparable calibrating device.

It will, of course, be understood that various changes may be made in the form, details, arrangement and proportions of the various parts without departing from the scope of my invention.

What I claim is:

1. A device for calibrating the stylus assemblies of a flight data recorder, comprising
   a commutator having a plurality of surface bands, each band being formed of one of two different materials, each band formed of one material being alternately arranged with respect to a band formed of the other material, said bands formed of one material corresponding to predetermined settings of the flight parameters to be calibrated, and said materials having different ultrasonic propagation factor, and spaced from a predetermined known point of reference, said commutator adapted to be engaged by stylus assembly of the flight data recorder,
   means for generating ultrasonic impulses operatively interrelated with said commutator and transmitting ultrasonic impulses thereto,
   a pickup sensor adapted to be connected with the stylus assembly and detecting ultrasonic impulses transmitted to the stylus assembly by the commutator and converting the ultrasonic impulses into electrical impulses,
   a receiver circuit connected with said pickup sensor to receive electrical impulses therefrom, and including signal producing means for converting the electrical impulses into perceptible signals.

2. The calibrating device as defined in claim 1 and a housing, said commutator and said ultrasonic generating means being supported by said housing.

3. The calibrating device as defined in claim 1 wherein said ultrasonic generating means comprises an oscillating circiut means connected to a source of electrical circuit means connected to a source of electrical current and converting the same into high frequency impulses, said oscillating circuit including a transducer for converting high frequency electrical impulses into ultrasonic impulses, said transducer engaging said commutator and transmitting ultrasonic impulses thereto.

4. The calibrating device as defined in claim 1 wherein said brass material has an ultrasonic transmission characteristic approximately twice that of said plastic material.

5. The calibrating device as defined in claim 3 wherein transducer comprises a lead zirconite crystal.

6. The calibrating device as defined in claim 1 wherein one of said materials forming said surface bands of the commutator comprising a metallic material, and the other of said materials comprising a non-metallic material.

7. The calibrating device as defined in claim 6 wherein said metallic material comprises brass and said non-metallic comprises a plastic.

8. The calibrating device as defined in claim 1 wherein said signal producing means includes a meter for visual perception, and a speaker device for producing an audibly perceptible signal.

References Cited

UNITED STATES PATENTS 2,425,537   8-1947   Hornbostel _____ 73—1

S. CLEMENT SWISHER, Primary Examiner

UNITED STATES PATENT OFFICE
CERTIFICATE OF CORRECTION

Patent No. 3,459,031                                                August 5, 1969

Ronald C. Davis

It is certified that error appears in the above identified patent and that said Letters Patent are hereby corrected as shown below:

Column 6, line 43, beginning with "4. The calibrating" cancel all to and including "a plastic." in line 55, same column 6, and insert 4. The calibrating device as defined in claim 1 wherein one of said materials forming said surface bands of the commutator comprising a metallic material, and the other of said materials comprising a non-metallic material.

5. The calibrating device as defined in claim 4 wherein said metallic material comprises brass and said non-metallic comprises a plastic.

6. The calibrating device as defined in claim 5 wherein said brass material has an ultrasonic transmission characteristic approximately twice that of said plastic material.

7. The calibrating device as defined in claim 3 wherein transducer comprises a lead zirconite crystal.

Signed and sealed this 7th day of July 1970.

(SEAL)
Attest:

EDWARD M. FLETCHER, JR.                              WILLIAM E. SCHUYLER, JR.
Attesting Officer                                                  Commissioner of Patents